Sept. 15, 1964　　　D. W. BEAN ETAL　　　3,148,689
METHOD AND SYSTEM FOR GAS TRANSMISSION
Filed Nov. 22, 1960　　　　　　　　　　　5 Sheets-Sheet 1

INVENTORS
DAVID W. BEAN
H. NORMAN EAGLETON
ROBERT R. OLSON
OTTO PRAEGER, JR.
BURT P. SCHABERG
DONALD J. VINSON
BY McGrew & Edwards
ATTORNEYS Sept. 15, 1964     D. W. BEAN ETAL     3,148,689

METHOD AND SYSTEM FOR GAS TRANSMISSION

Filed Nov. 22, 1960     5 Sheets-Sheet 2

INVENTORS
DAVID W. BEAN
H. NORMAN EAGLETON
ROBERT R. OLSON
OTTO PRAEGER JR.
BURT P. SCHABERG
DONALD J. VINSON

BY

ATTORNEYS

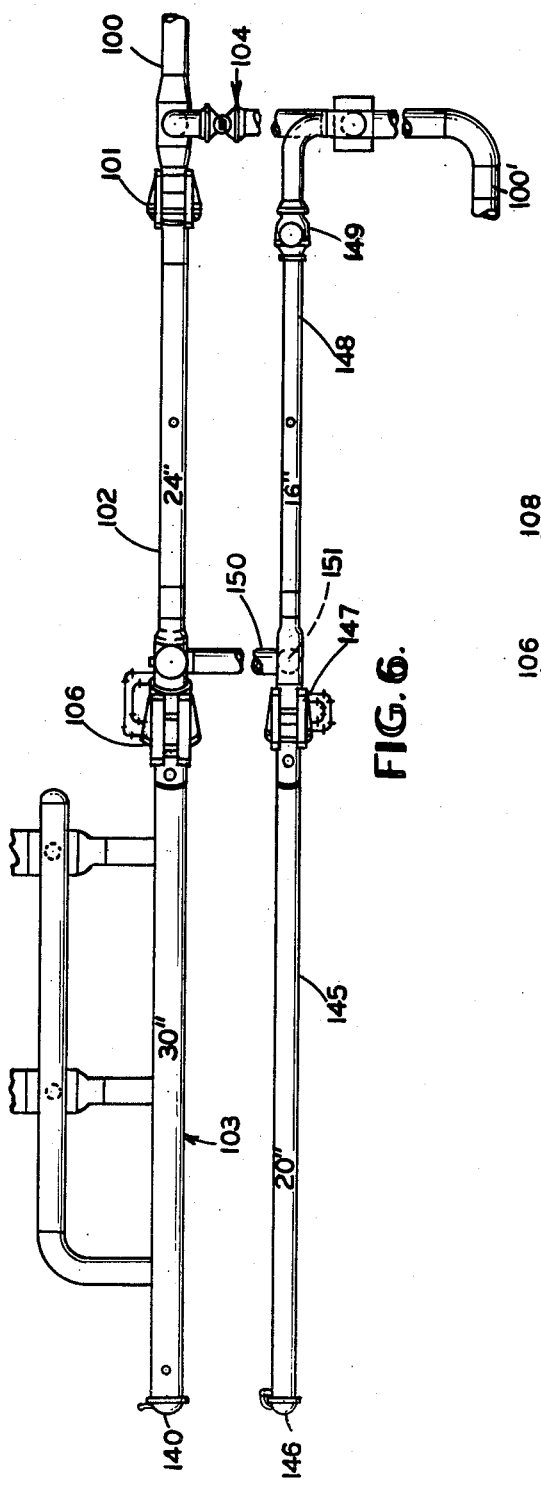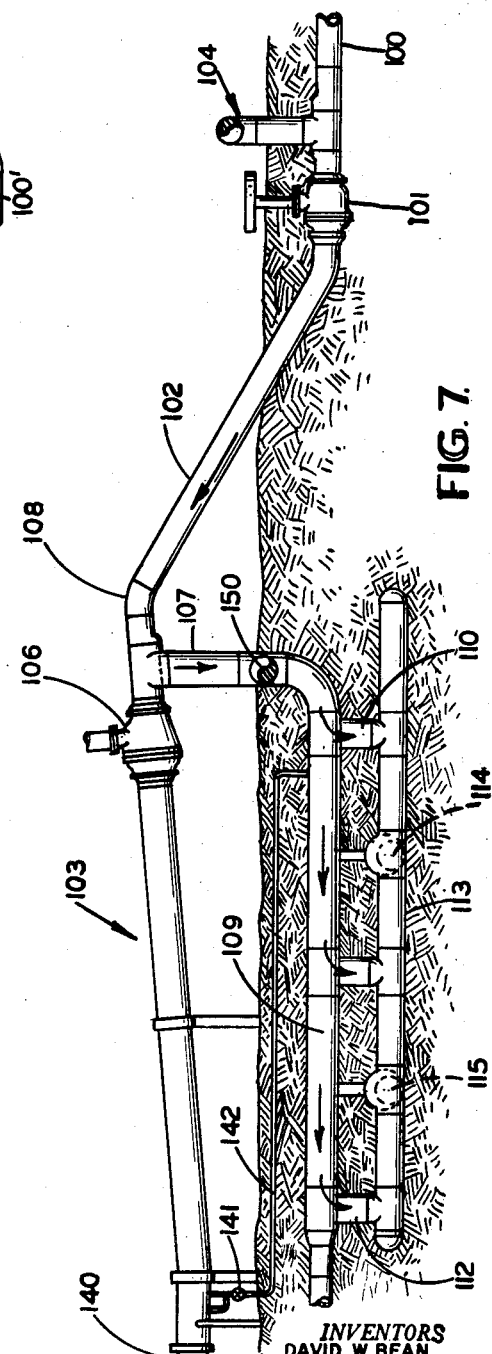

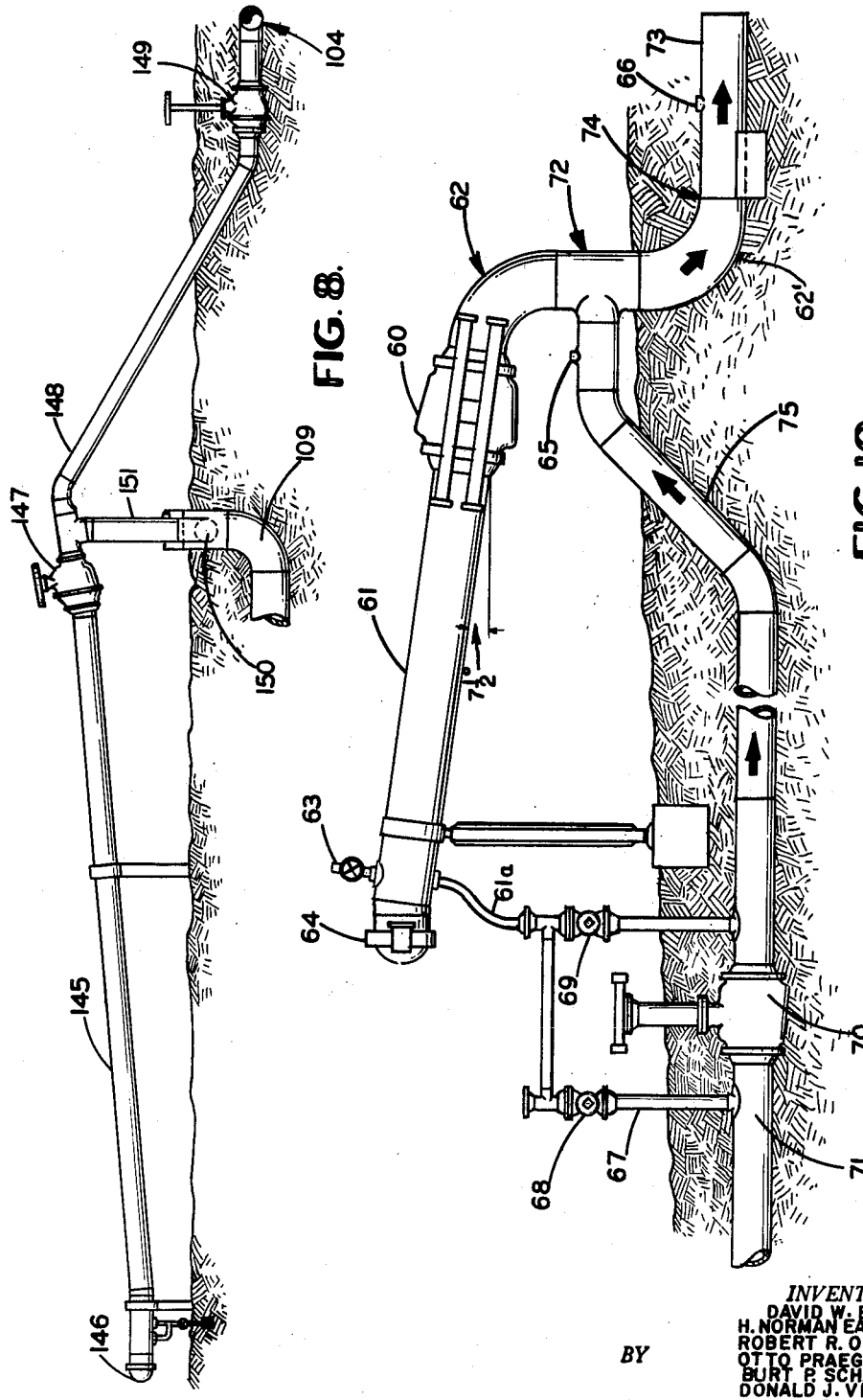

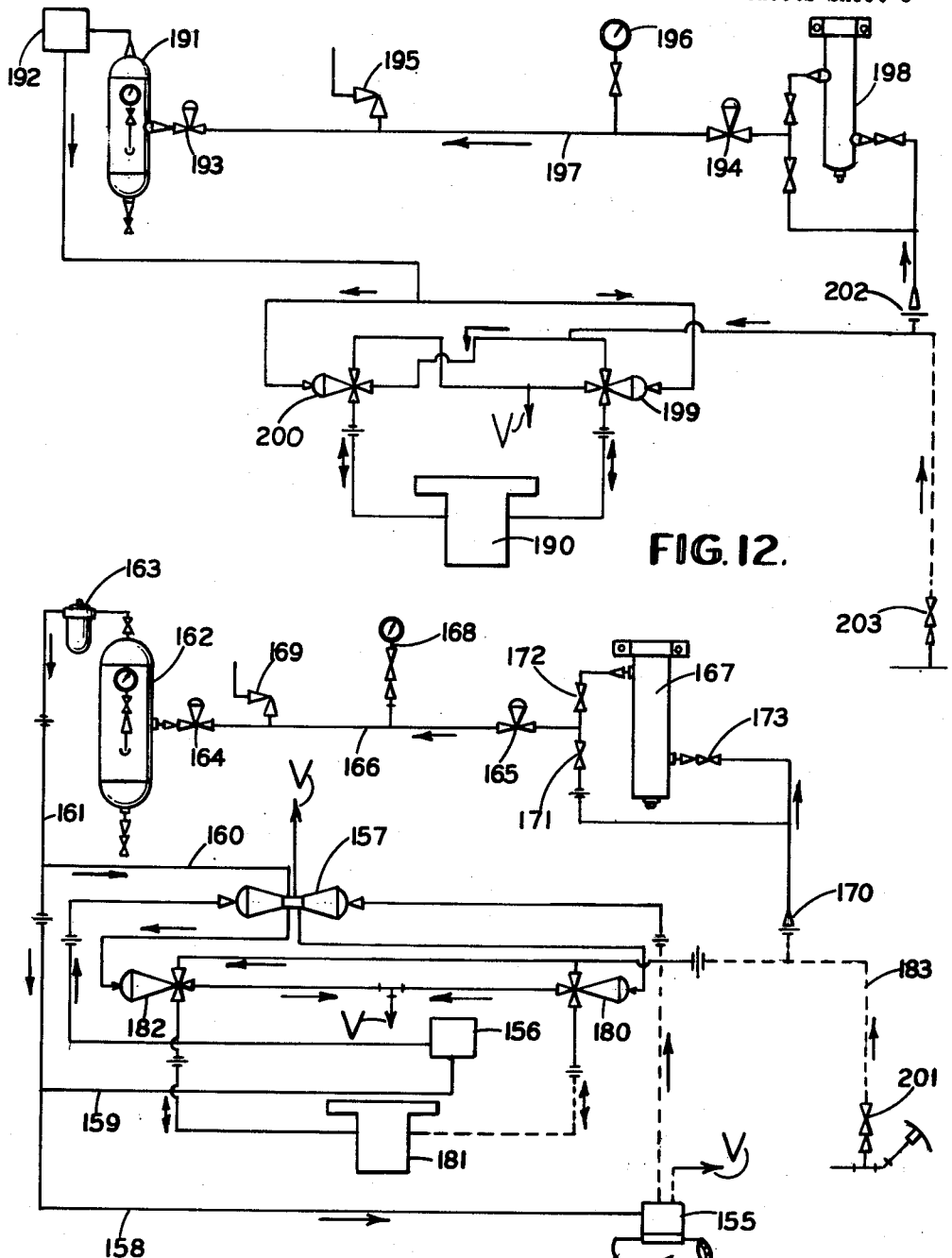

United States Patent Office 3,148,689
Patented Sept. 15, 1964

3,148,689
METHOD AND SYSTEM FOR GAS TRANSMISSION
David W. Bean, Harold Norman Eagleton, Robert R. Olson, Otto Praeger, Jr., Burt P. Schaberg, and Donald J. Vinson, all of Colorado Springs, Colo., assignors to Colorado Interstate Gas Company, Colorado Springs, Colo., a corporation of Delaware
Filed Nov. 22, 1960, Ser. No. 71,097
21 Claims. (Cl. 137—1)

This invention relates to method and systems for liquid removal from gas transmission lines, and more particularly to method and apparatus for the removal of condensation products from natural gas transmission pipelines.

At the present time the widespread use of natural gas has resulted in the development of extensive pipeline systems for the collection and transmission of natural gas from its in situ sources to collection and processing plants, or the like.

In such gathering systems, frequent operational difficulties occur due to condensation of materials contained in natural gas. This condensation tends to collect in each of the depressions and sags inherent in such pipeline systems crossing over miles of rolling countryside. This condensation product, referred to sometimes hereafter as "gasoline," collects in each of these sags and depressions and becomes an impediment to gas flow, obstructs contiguous flow, and results in large pressure losses.

Past investigators in the field have thought that normal gas velocities resultant from the natural gas wells themselves, at gas volumes and pressures existing in each pipeline section, were too low to sweep or move the condensed gasoline over each hill and through the depressions and sags in such pipelines. The pipeline described generally herein demonstrated this to be entirely correct. Pressure losses increased substantially as liquid accumulated in depressions and sags in this pipeline. The pressure drop resulting from conveying the liquid through this particular pipeline system had been calculated to be upwards of 400 lbs. p.s.i. However, the apparatus installations and arrangements necessary for maintaining such high operating pressures are expensive and require constant attention.

Other treatments, such as water removal after pressure testing of a new pipeline installation, have used oversize "squeegees" and the like which are forced through the pipelines in an effort to remove the trapped water. However, the pressure drop required to move these squeegees is considerably in excess of that desirable for efficient and economical operation of natural gas transmission lines. Furthermore, because the squeegee type operation requires oversize devices, there necessarily is a frictional wear resultant from use, with the related operational expenses and cost of replacement.

Additionally, in natural gas pipeline transmission, as the pipeline passes through the natural gas well fields there is an increasing volume of gas and fluids to be handled. Thus, increasing diameter of pipeline is necessary for the transmission. This changing of dimension, if the equeegee operation were attempted, would require complicated systems for removing the squeegees from the line at points of change to larger diameter pipe, or pumping or collection stations and change to larger diameter pipe and replacing those removed with larger diameter devices. Also, at the pumping stations (where it would be necessary to insert new and different size devices) cumbersome but precise equipment design would be necessary in order to maintain a gas-tight fit. This it true because of the high operating pressures necessary to force the squeegees through the system.

We have invented a new method for the removal of condensed gasoline and/or other liquid from the natural gas transmission systems which represents a departure from prior art practices, providing a highly efficient and economical operation. Furthermore, we have invented apparatus for accomplishing our novel method which is inclusive of novel launchers for inserting condensate removal spheres into pipelines, and novel receiver means for independent removal of those spheres at the end of the line. We have also invented novel method and apparatus for separating the liquid and gaseous constituents of the materials passing through the pipeline for subsequent selective introduction into storage areas, processing plants and the like.

Our method is a departure from prior methods particular in our use of a ball or undersized spherical mass rather than a squeegee or other oversize device. It has been previously thought that fluids could not be efficiently removed from pipelines without these oversize devices. However, as a result of extensive investigation and testing, we have discovered that spheres smaller in diameter than the pipeline through which they pass may be used effectively. Our investigations have indicated that the undersized spherical mass removes 97% or more of the liquid in place when the outer peripheral portion of the sphere is in close proximity to the pipeline interior surface. This may be due to the surface tension of the liquids being removed forming a meniscus between the inside of the pipeline and spherical mass, or to the fact that gas flows at a higher velocity in the annular space between the inside of the pipeline and the outer surface of the sphere; but in any event, a gas-liquid seal is formed in the said annular space.

Presently, these spheres are flexible, hollow, inflated neoprene rubber spheroids. However, they may be rigid plastic compositions such as styrene; or they may be either flexible or solid spherical masses. But in practice the sphere must be undersized with respect to the internal diameter of the pipeline with which it is to be used as is explained hereafter.

By use of our novel apparatus in the practice of the method of our invention, it is possible to remove upwards of 97% of the condensed liquids in the pipe with minimum pressure loss during the removal process, practically no pressure loss due to accumulated liquids immediately following the liquid removal operation, and without requiring pumping apparatus to provide additional line pressure. In a system of the type above outlined, it is possible to use a plurality of spheres of varying and different diameters in a continuous system to accommodate the varying diameters of pipe inherent in this type of gas transmission system.

As a plurality of such varying size spheres pass through progressively increasing diameter of pipelines, the smallest of the spheres is placed first in direction of flow with the largest last so as to utilize maximum sweeping effect throughout the operation. There are novel control means interconnected with launchers according to our invention which are adapted to be actuated by the largest, i.e., the last sphere, passing through the pipeline.

The above mentioned novel control means is adapted for regular, periodic and/or infrequent operations of varying or similar time cycles as desired. One attractive feature of our novel control means is that it is possible to set controls at a predetermined position such that spheres will be launched and progress through the pipeline to deliver the removed condensate at a processing plant during the working day. The control system is entirely pneumatically operated by changes in pressures, thus doing away with the necessity for extensive power supply and attention normally required by the usual complicated electric or electronic instrumentation. Furthermore, the only costs involved in operating apparatus in the practice of the method of our invention would be the infrequent labor costs required to place the spheres in the launchers and a minor replacement factor for normal wear and tear.

Therefore, it is among the objects and features of our invention to furnish simple, easily performed and efficient methods of removing fluids from gas transmission lines, which does not require constant attention, and which will operate over long periods of time without manual interruption or supervision. Also, it is a feature of our invention, that by proper adjustment of the novel control system, it is possible to obtain delivery of condensed gasoline and fluid products from the line to a plant or the like during the normal working day. This same control system allows regular, periodic, and/or intermittent operations according to varying time cycle requirements. Furthermore, by use of our method it is possible to remove the condensed fluids from pipelines without impeding or reducing the normal gas transmission without causing a significant change in operating line pressure nor requiring extensive pressurizing apparatus for its operation.

Other objects and advantages of our invention are to furnish simple, durable and economical apparatus for the rapid and efficient removal of condensation products from natural gas transmission pipelines without the necessity of extensive pumping and pressurizing apparatus and installations; which is adapted for entirely pneumatic instrumentation without the necessity of elaborate electrical or electronic controls; which allows for the removal of condensation products from such pipelines under the normal operating line pressure induced by gas flow from natural gas wells; which does not damage or cause excessive wear on the spheres used therein, thereby greatly increasing their useful life; and which automatically and efficiently compenates for the different diameters of interconnected lengths of transmission pipelines without the necessity of the removal of previously inserted spheres.

It is another object of our invention to provide novel receiver means for separating spheres from gaseous and liquid constituents, and which also separates the said liquid from gaseous constituents.

Still another object of our invention is to provide novel and improved time-controllable launcher means for introducing condensate removal spheres into gas transmission pipelines.

It is a further object of our invention to provide novel and improved launcher means for selective insertion of condensate removal spheres into gas transmission pipelines according to predetermined requirements, and which are adapted to be selectively actuated by spheres previously introduced into the pipeline by another launcher used in practicing our novel method.

Many other advantages and features inherent in our inventive concepts will become evident to those skilled in the art from a study of the drawing description set forth hereafter. In these drawings:

FIG. 6 is a fragmentary schematic top elevation of an alternative arrangement for a dual receiver station;

FIG. 7 is a schematic side elevation of a portion of the apparatus of FIG. 6;

FIG. 8 is a side elevation of another portion of the apparatus of FIG. 6;

FIG. 10 is a schematic side elevation of an alternative launcher arrangement;

FIG. 11 is a schematic diagram of control system instrumentation usable with launchers in the system subsequent to the first launcher; and FIG. 12 is a schematic diagram of control system instrumentation within our concepts usable with the first launcher in the system.

Before describing the drawings in detail, we wish it understood that they are merely exemplary of method and apparatus embodying our inventive concepts, and we do not desire to be limited thereto; but rather that the spirit and scope of the invention be as defined by the hereafter appended claims.

System for Liquid Removal

Figure 1:
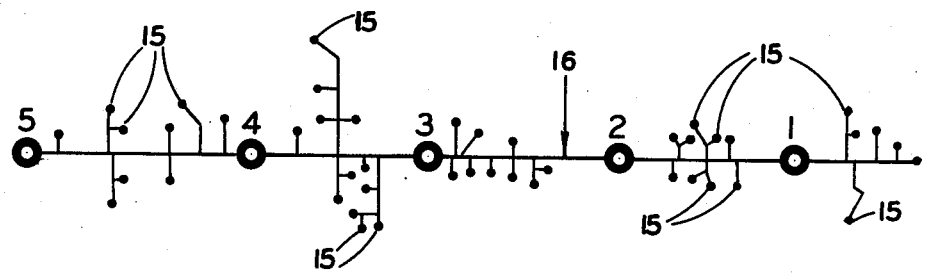
FIG. 1 is a schematic diagram of a gas transmission system arranged for the practice of our method of condensate removal from gas transmission pipelines.

A gas transmission liquid removal system according to our inventive concepts is generally indicated in FIG. 1 and represents a typical installation using our invention. A plurality of gas wells 15 are shown spaced along and interconnected with a gas transmission pipeline generally indicated by reference character 16. At intermediate positions along the pipeline 16, and spaced between groupings of natural gas wells 15, are a plurality of launchers numbered 1 through 4 with a receiver system indicated by the numeral 5 at the end of the line. The first launcher, indicated by numeral 1, is of the same configuration as the other three except for the control mechanism interconnected therewith.

The control mechanism which is associated with the first launcher has a time controller adapted for predetermined time settings for initiating the launching of spheres into and through the pipeline 16. For instance, it can be set on one day, to launch the first sphere during the early morning hours of the following day, in order that the liquid in the line arrives at the processing plant and storage area associated with the receiver 5 during normal working hours.

Thereafter, the launcher 1 can periodically launch additional spheres according to the same or a different predetermined time pattern. The launchers indicated by numerals 2, 3 and 4 are adapted to be progressively actuated to launch increasingly larger sizes of spheres to facilitate the continued removal and progression of the condensed fluid from the increasing diameter of interconnected pipeline sections as explained hereafter.

Each of the launchers 2, 3 and 4 is interconnected with control systems different than that of launcher 1. These systems are adapted to be actuated by a sphere passing through the line that has been launched by a preceding launcher. When the sphere launched by a preceding launcher reaches the next launcher in the system, the control mechanism is actuated after a time delay to move a release valve which, in turn, launches a sphere capable of continuing the removal of condensed fluid from the next larger size of pipeline. As that sphere is launched, it again actuates control mechanism of the launcher with which it is associated to return the launcher valve to position for the next launching cycle.

As was noted above, a series of launchers are located along the line each of which is adapted to launch a larger size of sphere. Each of these have a storage barrel of progressively increasing internal diameter. Details of construction of the launchers will be explained in detail hereafter under the subsection titled "The Launchers."

In practice, the distance between adjacent launchers may be on the order of ten miles and even greater distances may be used depending upon the characteristics of the natural gas fields with which the systems are associated. The first section of pipeline may be approximately sixteen inches I.D., with other sections progressively increasing through eighteen, twenty and twenty-four inches I.D. The launchers, such as the launchers shown schematically in FIG. 1, are progressively spaced at intervals along the pipeline where it changes diameter and are arranged for launching spheres of increasing size.

As the spheres are launched and progress through the system as above described, the fluid is propelled in advance of the spheres of largest diameter without a decrease in normal operating line pressure. Furthermore, experimentation and observation of operation have indicated that our undersized spherical masses, i.e., spheres of lesser diameter than the inside diameter of the pipeline, are or may be influenced by gravity in their movement along downward stretches of pipeline in the various sags and depressions inherently therein. Thus, as the spheres travel down the slope of such a bend or depression their momentum increases thereby increasing the momentum of the fluid being propelled.

With our launchers presently in operation, it is possible to store up to ten spheres in each of the storage barrels and, with proper calibration of the instrumentation of the control system, extended periods of uninterrupted and untended operation of well over a week are possible.

In one test, after a two-day time delay which had been calibrated and coded into the control system, 67,000 gallons of fluid were removed from a four launcher pipeline installation. In this test, there was negligible manual supervision for the instrumentation and launchers in the system.

A receiving and storage unit, which we refer to as a "receiver," is provided at the terminal end of the transmission system. In the description set forth hereafter, various types of receiver installations within our concepts will be explained in detail. At this point, suffice it to say that the receivers are of novel design and arranged for independent removal of the spheres from the pipeline with simultaneous gas and liquid separation and liquid removal to storage facilities. Furthermore, there is a novel collection and storage system associated with this gaseous and liquid separation and removal.

The Launchers

Figure 3:
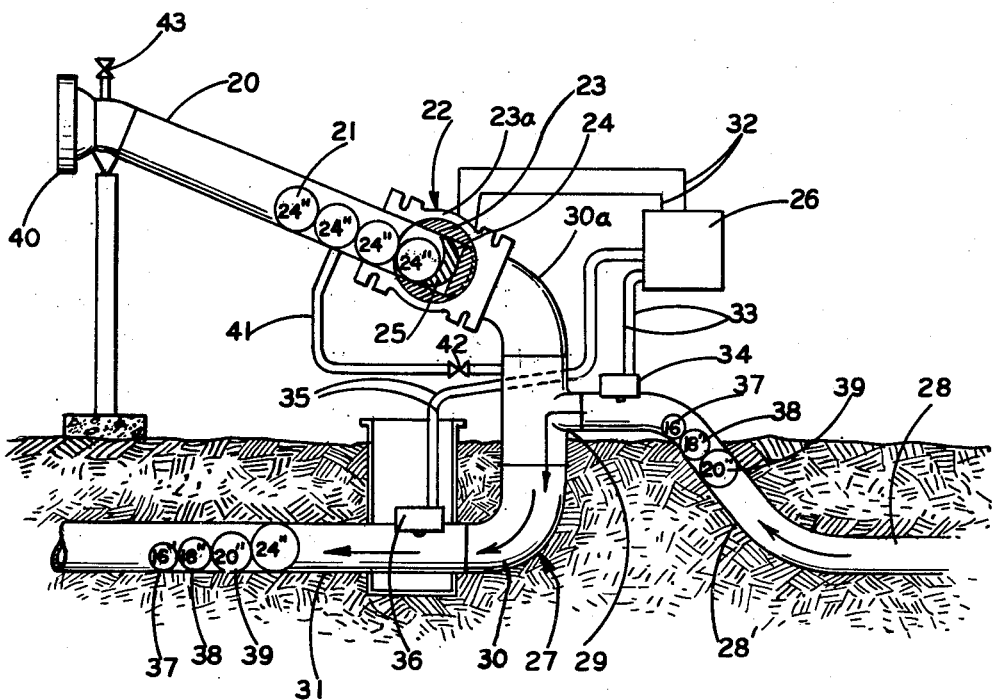
FIG. 3 is an enlarged schematic side view of a launcher within our concepts.

Launchers operating according to our concepts are shown in FIGS. 3 and 10. As was noted in the section immediately above, the diameter of the storage barrel 20 in FIG. 3 will vary according to the diameter of the sphere which is to be launched by the respective launchers. In FIG. 3 we have shown what we term a twenty-four inch sphere launcher, i.e. spheres launched therefrom are for a twenty-four inch pipeline section. However, as will be clear hereafter, the spheres are actually of lesser diameter than the respective sections. By inclining the storage barrel 20 at an angle of about 10°, the force of gravity is utilized to induce the rolling movement of the spheres 21 down to and in operative association with a launcher valve indicated by reference character 22. It is important that the storage barrel 20 of the launcher be sufficiently large that there will be a minimum of frictional retardation of the spheres therein, and some suitable valving arrangement for controlled discharge of the spheres must be provided.

The valve shown at 22 is the sole invention of Burt P. Schaberg and features shown and described but not claimed herein have been claimed in his co-pending application Serial No. 48,265 dated August 8, 1960 for Methods and Apparatus for Launching and Extracting Spheroids in Pipelines. Said valve is a preferred control means and comprises essentially three portions, i.e. a housing 23a, an outer seal portion 23 which is generally of a spherical shape having an opening or recess 24 therein, and a spherical basket or seat 25 mounted in the recess. The basket 25 and the recess 24 are of sufficient depth and design configuration to admit a sphere entirely within the extended peripheral surface of the seal portion 23. Thus, the valve 22 is arranged for single sphere removal from the launcher barrel.

Except for the first launcher in the system (the difference being discussed hereafter), the control system 26 and the reducing branch T 27 and reducing L or passage 30 are the same except for dimensional variations.

The upstream pipeline section 28 is interconnected in the intermediate extension portion 29 of the T 27. The launcher valve 22 is interconnected with the reducing branch T 27 through the L or passage 30a which serves as one arm of the T; and the next section or downstream portion 31 of the pipeline is interconnected with the other arm of the T. The control system 26, which will be described in detail hereafter, is interconnected through pressure lines 32 with the valve 22; through pressure lines 33 with a first sphere sensing device 34; and through pressure lines 35 with another sphere sensing device 36.

The configuration shown in FIG. 3 indicates that it is the fourth in a transmission pipeline subsequent to sixteen, eighteen and twenty inch sphere launchers. Three such spheres 37, 38 and 39 are shown moving up the sloped portion 28' of the pipeline 28. The sensing element 34 is so designed and positioned as to be actuated only by the twenty inch sphere, that is, the sphere generally indicated by reference character 39. Thus, the spheres 37 and 38 will pass thereby through the lower arm of the branch T 27 and into the pipeline section 31 without actuating the first sensing device 34. However, as the sphere 39 passes said sensing element, the control system is actuated.

Upon actuation, there is a slight time delay in which the sealing portion 23 of the valve rotates 180° to a launching position opening into the reducing branch T passage 30a. As the valve 23 reaches the launching position, the sphere 39 will have passed into the arm 30 of the T 27 interconnected with the pipeline section 31. The twenty-four inch sphere, as indicated in FIG. 3, will then drop under the influence of gravity through the reducing branch T, and under the continued influence of the operating line pressure, will be moved past the sensing device 36. The sensing element 36 is adapted to be actuated only by one of the spheres 21 launched from its associated launcher and the sixteen, eighteen and twenty inch spheres will pass thereby without actuating it. When the twenty-four inch sphere passes by the sensing device 36 it actuates the control system to cause a 180° return movement of the sealing section 23 to thereby allow the next twenty-four inch sphere in the storage barrel 20 to move into the basket 25.

A suitable cover 40 is releasably secured in gas-tight relationship with the inlet end of the storage barrel 20 of the launcher. A line 41 is interconnected between the storage barrel 20 and pipeline operating pressure by interconnection to the reducing branch T. A valve 42 is in the line 41 for closing the line 41 from the T and line operating pressure. A blowoff valve 43 is interconnected with the barrel 20 near the outlet. Thus, when under operating conditions, the valve 43 and the closure 40 seal the barrel from the atmosphere. The valve 42, which is normally open, allows equal pressurization of the storage barrel 20 and the transmission system. When it is desired to reload the launcher, the valve 42 is shut off and the blowoff valve 43 opened, thus returning the storage barrel to atmospheric pressure.

Figure 5:
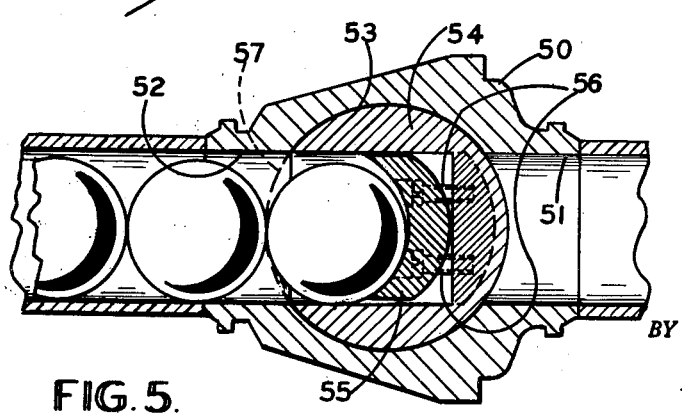
FIG. 5 is an enlarged detailed schematic view in partial section of a launcher valve usable with a launcher such as shown in FIG. 3.

FIG. 5 more clearly discloses the configuration of the launching valve which is preferably used in launchers according to our invention. The outer casing 50 is inclusive of a launching extension 51 and a storage barrel sphere receiving extension 52. Intermediate the extensions 51 and 52 and in sealing relation with a hemispherical chamber 53, is the rotatable sphere receiving sealing portion 54. The center portion of the sealing member 54 is hollow and adapted to receive a basket or seat 55.

The basket is adapted for interconnection with the sealing portion 54 as by bolts 56 and is mounted sufficiently deep in the sealing portion 54 to allow a single sphere to be received therein. The extended surface 57 of the sealing member 54, indicated by dotted lines in FIG. 5, indicates how the sealing member 54 may rotate without allowing another sphere to come in contact with the basket, or interrupt the single sphere removal operation.

FIG. 10 shows an alternative launcher arrangement including a valve 60 similar to that shown in FIG. 5. The launcher barrel 61 is interconnected at the inlet end of the valve 60 to a reducing branch T 62 and is sloped at an angle of at least 7½° to induce the desired gravity movement of the spheres toward the valve 60. We have found that 10° is the preferable inclination for the twenty-four inch sphere launcher (FIG. 3) whereas 7½° is the preferable slope for the smaller diameter launcher (FIG. 10). A blowoff valve 63 and a closure member 64 are mounted on the launcher barrel and serve purposes similar to the closure 40 and blowoff valve 43 mounted on the launcher of FIG. 3 which were previously described. A reducing L 62′ is interconnected from the branch T 62 with the downstream pipeline section 73.

In the launcher of FIG. 10 the barrel 61 is sloped toward and in the direction of the transmitted gas flow, whereas the launcher of FIG. 3 is sloped in opposition to the direction of gas flow. This arrangement of the drawings is entrely schematic. We have found that the relation between the direction in which the launching barrel slopes and the direction of gas flow has no significant effect on the efficiency of the launcher.

Suitable sensing devices 65 and 66 are shown schematically in FIG. 10 and serve purposes similar to the sensing devices 34 and 36 in FIG. 3. They are interconnected with a control system through pressure lines similar to the lines 32, 33 and 35 of FIG. 3, but such lines have not been shown in FIG. 10 for purposes of simplicity. The bypass pipeline system 67 and its valves 68 and 69 cooperate with the valve 70 in the transmission line 71 to allow the necessary pressurization and depressurization of the launcher through the interconnecting pipeline 61a.

The reducing branch T 62 is of greater diameter in its head portion 72 than both the incoming pipeline 61 and the outgoing pipeline 73. At this point of interconnection 74 to the outgoing pipeline 73 the diameter of the T is swaged or reduced to that of the outgoing section of the pipeline by connection with a reducing L 62′. This arrangement assists in providing added positive momentum factors to the spheres passing therethrough since there is a minimum of frictional retardation during their drop from the launcher valve to the pipeline. The sloping portion 75 of the incoming section 71 serves a purpose similar to that of the sloping section 28′ of FIG. 3, i.e., it tends to slow down the incoming spheres as they come in contact with the sensing element 65 and before they drop through the section 72 of the reducing branch T 62 and into the reducing L 62′.

Therefore, in operation it is possible to set the time cycle controller of the control system of the No. 1 launcher to launch the first sphere at a definite predetermined time, say four o'clock in the morning, for example. The foregoing will automatically launch a sphere from the first launcher into the pipeline at four o'clock. This first sphere progresses through the pipeline at an established speed until it contacts the first sensing device of the next launcher in the system. This may be almost any distance desired because of the novel features of our arrangement resultant from using undersized spherical masses which incur negligible pressure drop.

Thus, when the next launcher is actuated, the valve associated therewith rotates 180° and launches another sphere. The influences of gravity and our reducing branch T arrangement exert position forces thereon and direct it into the line behind the first launched sphere. As the newly launched sphere progresses from the reducing T behind the first launched sphere, a second sensing device associated with that launcher actuates the control system of that launcher to return the valve through a 180° rotation to starting position to receive another sphere for subsequent operation as before.

The foregoing procedure is repeated as each succeeding launcher in the pipeline is actuated by that sphere launched by the next preceding launcher in the system, i.e., the next subsequent launcher can only be actuated by the last sphere in the group of spheres passing through the pipeline and thus maintains the desired order of sphere travel in the line.

The Receivers

Figure 4:
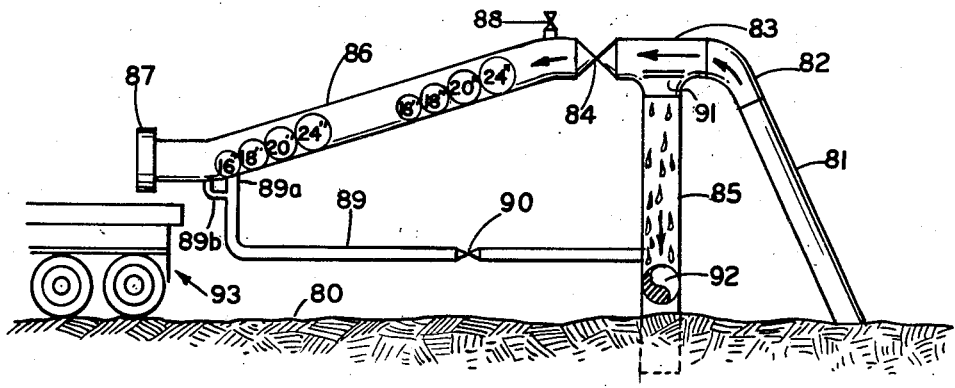
FIG. 4 is an enlarged schematic side view of a receiver according to our concepts.

Receivers of a novel type usable in our method are generally shown in FIGS. 4, 6, 7, 8 and 9. The receiver design shown in FIG. 4 is perhaps the simplest arrangement and configuration. It is shown as supported on the ground 80 and having an upwardly sloping inlet portion 81 interconnected with the last section or end of the transmission pipeline. The inlet 81 opens through a pipe L 82 and T 83 to a valve 84 and the vertical fluid-receiving section 85.

This receiver is comprised essentially of an elongated tubular receiver barrel 86 which may be on the order of 60 feet in length and is adapted for receiving a plurality of spheres from the pipeline. The other end of the barrel 86, opposite the valve 84, has a cover or closure 87 releasably secured thereto in gas-tight relation. A suitable blowoff or purge valve 88 is mounted on the storage barrel, preferably adjacent the valve 84. An L-shaped pipeline 89 is interconnected between the barrel 86 and the vertical fluid-receiving section 85. A valve 90 is suitably incorporated in the pipeline 89. A screen or grill arrangement 91 is mounted in the T 83 above the vertical fluid-receiving section 85 for separation of spheres from fluid passing through the grill.

In operation, the spheres passing through the transmission pipeline enter storage barrel 86 through the valve 84. It has been found that the storage barrel should be inclined at least about 5° so that the spheres will roll under the influence of gravity through the barrel when they are to be withdrawn.

The L-shaped pipeline 89 with its valve 90 is normally open to permit liquid to drain from barrel 86 to vertical fluid receiving section 85. Pipeline 89 is much smaller than barrel 86 or fluid receiving section 85 so that fluids or gas trapped in barrel 86 by incoming spheres will drain out slowly providing a hydraulic or pneumatic cushion to bring the spheres slowly to rest. Pipeline 89 is connected to pipeline 86 preferably close to enclosure 87 so that all liquids are drained from barrel 86 at the time closure 87 is removed to recover spheres from barrel 86. Pipeline 89 is connected to barrel 86 by two spaced branches 89a and 89b using a dimension between openings thereof which will prevent both openings from being covered by adjoining spheres. A suitable opening 92 which opens into the section 85, spaced above the liquid-receiving and storage area, provides a method of installing two complete receivers, side by side using a common liquid receiving and storage area as described with reference to FIG. 2. Liquid and gas from both receivers will fall by gravity down line 85 and line 92 on into the common storage area.

When the spheres have been removed from the line and/or when the barrel 86 is filled, the valve 84 and the valve 90 are closed. The blowoff valve 88 is then opened to vent the chamber to the atmosphere. Next the closure 87 may be opened and the spheres allowed to roll into a truck 93, or other receptacle for suitable disposition, and/or return to the respective launchers from which they were originally launched.

Figure 2:
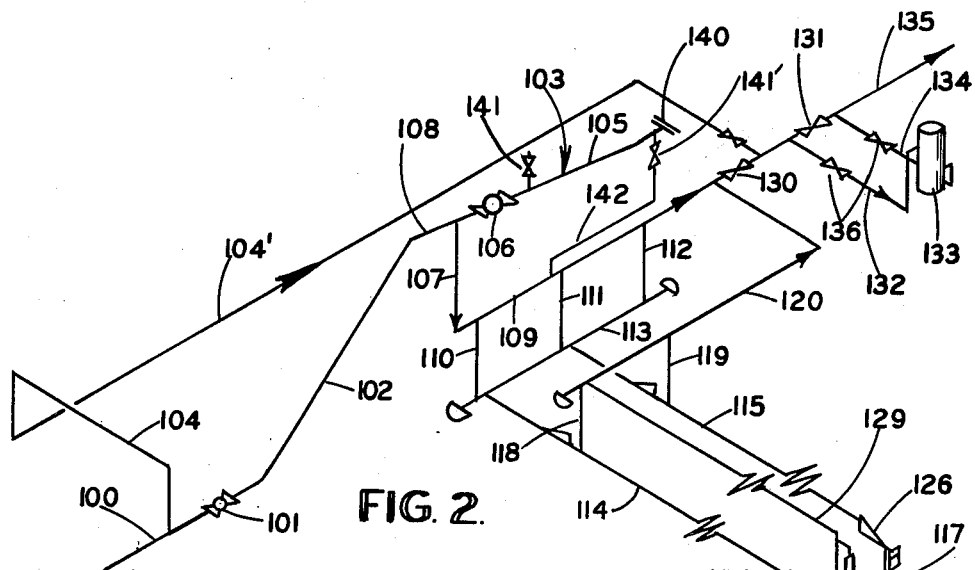
FIG. 2 is a perspective schematic view of a sphere receiver and gas and liquid separation station according to our invention.

FIG. 2 schematically illustrates our preferred receiver station or unit and is shown mounted at the end of gas transmission pipeline 100 and interconnected through a valve 101 with the upwardly sloping inlet portion 102 of the receiver 103. Preceding the valve 101 in the direction of flow and interconnected with the line 100 is a branch pipeline arrangement 104 into which are connected a plurality of other receivers similar to the receiver 103 as will be apparent hereafter with reference to FIGS. 6, 7 and 8.

The storage barrel 105 of the receiver is interconnected with the sloping portion 102 through an inlet valve 106. A vertical fluid-receiving branch conduit 107 depends from the pipeline section 108 interconnecting the upwardly sloping portion 102 and the inlet valve 106. The vertical conduit 107 opens at its bottom into the horizontal branch conduit 109. Depending therefrom are a plurality of spaced, generally vertical legs or conduits 110, 111 and 112. These conduits open at their respective bottom portions into a horizontal branch section 113 which is substantially parallel to the conduit 109. A pair of horizontally extending branches 114 and 115 are in the same plane as the branch section 113 opening therefrom at one end, and to a pair of spaced substantially vertical branches 116 and 117 at their respective opposite ends. Intermediate the ends of the branches 114 and 115 are a pair of spaced riser sections 118 and 119, one each interconnected with one each of the branches 114 and 115. The other end of the risers open to the substantially horizontal conduit 120 which is in a plane parallel to but spaced a substantial distance above the branches 114 and 115.

Referring again to horizontal branches 114 and 115, these branches are interconnected, respectively, through reducers to end closures 125 and 126 respectively. Dependent from the branches 114 and 115, respectively, the opposite end of each of the branches 116 and 117 is interconnected with another horizontal conduit 127 functioning as a liquid storage area. Still a third vertical conduit 128 is interconnected with the horizontal conduit 127 preferably at a point between the branches 116 and 117. The upper end of the conduit 128 is interconnected with another horizontal conduit 129 at one end thereof. The opposite end of the conduit 129 is interconnected with the substantially horizontal conduit 120.

In operation, therefore, as spheres pass through the pipeline system they eventually reach the end portion 100, pass through the valve 101 and up the sloping section 102 propelling liquid and gaseous material therebefore. As the propelled mass reaches the section 108, the liquid and gaseous material pass by gravity through vertical conduit 107 and into the conduit 109. At this point the liquid will pass by gravity through the vertically spaced legs 110, 111, 112, through the branches 114 and 115, and eventually into the liquid storeage area of conduit 127. Since the liquid is heavier than the gas, the gas is displaced therefrom and passes either along the conduit 109 or through the risers 118 and 119, conduit 120 and through the valve 130. Sometimes large slugs of liquid will enter the receiver system shown in FIG. 2, and the provision of the storage arrangement including rapid gas displacement permits otherwise excess liquid to be contained without overtaxing said system.

In operation, the valve 130 is normally in an open position and the valve 131 closed. When so positioned the gaseous material passes throught the line 132, through a gas liquid separator 133, the line 134 and to the pipeline 135 for delivery and disposition as desired. The lines 132 and 134 each have a valve 136 which, in concert with the valve 131, allow for cutting the gas liquid separator in and out of the system.

The storage barrel 105, at its rear portion has a closure 140, a valve 141' interconnecting the rear portion of the storage barrel, through line 142, with horizontal conduit 109. A purge valve 141 is located near the opposite end of barrel 105 adjacent to valve 106. The closure 140 and purge valve 141 may be similar to and operate in a manner similar to the purge valve 88 and closure 87 in the receiver of FIG. 4.

With the arrangement of FIG. 2, a plurality of receivers may be interconnected across the pipeline bridge 104. In such an arrangement (as will be described in reference to FIGS. 6, 7 and 9) each of the receivers is adapted to receive a plurality of spheres of different sizes proceeding toward this central point from a completely different direction than pipeline 100 (i.e. such as pipeline 100' FIG. 6). Each of them is interconnected through suitable piping with the liquid collection system for eventual drainage into the conduit 127 for delivery through pipeline 127' to suitable storage or processing areas. The interconnection of this plurality of receivers to complete the circuit for delivery of gaseous fluid to the gas liquid separator 133 has been schematically indicated in FIG. 2 by reference numeral 104'.

In FIG. 7 the receiver 103 is shown in more detail. FIG. 6 is a top view of the receiver 103 indicating its spaced relationship to a plurality of other receivers such as the receiver 145 (see also FIG. 6). The receiver 145 is adapted to receive the sixteeen inch and smaller size spherical masses, while the receiver 103 is adapted to receive the twenty-four inch and smaller spherical masses. Each of the receiver barrels is oversize with relation to the spheres it is to receive, i.e. the twenty-four inch receiver is shown as a thirty inch barrel and the sixteen inch receiver as a twenty inch barrel.

The receiver 145 has a closure 146 similar to the closure 140 of the receiver 103. It also has a valve 147, an upwardly sloping section 148, and a valve 149 similar in function and operation to the valve 106, section 102 and valve 101 of the receiver 103. The pipeline section 150 at the bottom of the vertical section 151 is interconnected through the said pipeline 150 eventually with the liquid separation system described above. In each of the receivers the storage barrels are larger in internal diameter than the spheres to be received to permit gravity discharge when the barrel is opened.

In operation, therefore, the spheres approach the end of the pipeline 100 in order of smallest sphere first, progressively increasing to the largest sphere last. All these spheres will proceed up through the valve 101 and the pipeline section 102 into the storage barrel of the receiver 103. In a similar manner, a separate group of distinctly different sized spheres will approach the end of pipeline 100' and will proceed up through the valve 149, pipeline section 148 and into the storage barrel 145. The liquid and gas preceding the second group of spheres will drop through vertical conduit 151 and to horizontal pipe 150 into the common liquid separation and storage facilities as mentioned above.

Figure 9:
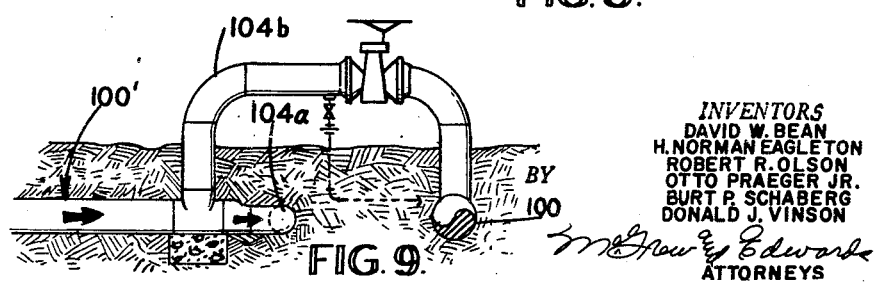
FIG. 9 is a schematic end view of a portion of the apparatus of FIGS. 6 and 7.

FIG. 9 indicates an end view of a gas bypass and interconnection between pipelines 100 and 100' to provide operating flexibility. This bypass and interconnection is indicated by pipeline 104b. In this FIG. 9, pipeline 104a connects to valve 149 as shown in FIG. 6. FIG. 8 is a side view of the receiver 145 further indicating its interconnection through the vertical section 151 with the conduit 150 to the fluid collection system conduit 109.

*Instrumentation*

FIG. 11 is a schematic illustration of one pneumatic control system for the launchers used in the system subsequent to the first launcher. The diagram of FIG. 12 is schematically illustrative of the instrumentation for our first launcher. In FIG. 11, a sensing device or valve 155 is mounted on a section of pipeline 155a. The sensing device 155 is essentially a micro valve adapted to be actuated by the passage of a predetermined sized sphere thereby. A downstream sensing device or valve 156 is similar in all respects to the sensing device 155. Sensing devices are connected, one each, to opposite sides of the double diaphragm valve 157. The foregoing three valves (155, 156 and 157) are interconnected by means of lines 158, 159 and 160 to the reference pressure line 161. The reference pressure line opens from a liquid reservoir or trap 162 through a lubricator 163. A pair of valves 164 and 165 interconnect the liquid reservoir 162 and the related pipe sections, through pipeline 166, with a gas dehydrator 167. A suitable gauge 168 is mounted on line 166 to indicate line pressure therein. A release valve 169 is also interconnected with the pipeline 166 for relief thereof. Reducer 170, and valves 171, 172 and 173 are interconnected with lines opening from the gas dehydrator. The sole purpose of the foregoing pipe sections, the liquid reservoir 162, and the gas dehydrator 167, is that of providing a 40 p.s.i.g. lubricated instrument gas to the three valves 155, 156 and 157.

When a sphere passes the valve 155 (just before it enters the center of a launcher T) it sends a 40 p.s.i.g. signal to the double diaphragm valve 157, which valve in turn sends a 40 p.s.i.g. signal to a "Dahl Bantam" valve 180; which valve in turn sends a 700 to 800 p.s.i.g. signal to the valve operator 181. Receiving such a signal, the valve operator will rotate the launcher valve 180° from the storage barrel side to the reducing T side to thereby launch a sphere.

The signal from the sensing valve 155 cannot be sent directly to the "Dahl" valve 180 because its signal is of a short duration. This short impulse from the sensing device valve 155 forces the double diaphragm valve 157 to a position in which it stays until it receives a signal from the other sensing device valve 156 on the downstream side of the launcher. When a sphere is launched and passes a contact with the downstream sensing valve 156, it sends a 40 p.s.i.g. impulse to the double diaphragm valve 157 which in turn sends a 40 p.s.i.g. impulse to the "Dahl" valve 182; which in turn sends a 700–800 p.s.i.g. signal to the valve operator 181; which in turn imparts a return 180° rotative movement to the launcher valve.

The various valves and lines are suitably vented to the atmosphere, when necessary, by means of vents indicated in the drawings by V. The valve 201 which is interconnected to the lubricated instrument gas system, is for equalizing and pressurizing the system from line 183.

In some installations it has been found desirable to mount the valve 156 in direct connection with the valve operator 181 although this arrangement is not shown. In such an installation the valve 156 is adapted to be actuated when the valve operator 181 reaches its extended position under the influence of the "Dahl" valve 180. When the extended position of the valve operator has been reached, the valve 156 operates in a manner similar to that above, i.e. actuation of the double diaphragm valve 157 and the "Dahl" valve 182, to in turn exert a 700–800 p.s.i.g. impulse for the actuation of the valve operator 181, and thereby return the launcher valve to a position in registry with another sphere in the storage barrel of the launcher in preparation for the next cycle of operation.

The valve operator 190 of FIG. 12 which operates the launcher valve of the No. 1 launcher of the system is similar in all respects to the valve operator 181. However, the control system with which it is associated is somewhat different. In this system there is a liquid reservoir 191, which is similar to the reservoir 162 of FIG. 11, which additionally prevents liquids from entering the time cycle controller 192. A pair of valves 193 and 194, interconnected with a relief valve 195 and pressure indicator 196, function in the same manner as the respective portions 164, 165, 169 and 168 of FIG. 11. The foregoing are interconnected through the line 197 to the gas dehydrator 198 which has a valve arrangement, again similar to the system of FIG. 11.

The valve operator 190 is interconnected between a pair of "Dahl Bantam" valves 199 and 200. The reference pressure of the system is 20 p.s.i.g. The time cycle controller 192 is adjusted to provide a 20 p.s.i.g. signal to the diaphragm of both the "Dahl" valves 199 and 200 for a period of about two minutes during which time a sphere is launched from the launcher with which it is associated. This two minute cycle can be transmitted every six minutes, every day, every seven days or any interval between the extremes thereof. It has been the normal practice that the cycle be set for sphere launching every two days.

When the time cycle controller 192 operates to send the 20 p.s.i.g. signal to the diaphragm of valve 199, a 700 to 800 p.s.i.g. pressure is supplied to the valve operator therefrom; and pressure is vented from the valve operator by the valve 200. This rotates the launcher valve 180°. When the 20 p.s.i.g. signal is released from the diaphragm of valve 199, pressure is supplied to the valve operator through valve 200 while pressure is vented through the valve 199. The foregoing causes an actuation of the valve operator and return 180° rotation of the launcher valve with which it is associated.

In the No. 1 launcher of the system there is a downstream sensing device. However, with the No. 1 launcher the sole function of the downstream sensing device is to count the spheres launched into the pipeline. This downstream sensing device is interconnected with an automatic counting device (not shown) which is preferably easily readable from outside the apparatus.

The foregoing counting arrangement has not been shown in the drawings since it may be any of many well known arrangements. Thus, periodical readings of the counter associated with the No. 1 launcher of the system will readily avail the viewer of the number of spheres remaining in the launcher and how many have been launched.

Thus, each of the launchers has two sensing devices associated therewith. In all but the first the two sensing devices are interconnected with the main gas transmission pipeline and adapted to be actuated by spherical masses of predetermined diameter passing thereby.

In the No. 1 launcher of the system two sensing means serve functions of controlling launcher operation. They are first, the time controller and second, the counter. Also, each of the control systems operate against a static or reference pressure. The initial pressurization of the respective systems may be accomplished through suitable manipulation of valve 201, as shown in FIG. 11, and the lines with which it is associated as described above. Valve 203 and the lines with which it is interconnected serve similar purposes for the system of FIG. 12.

Furthermore, in each of the systems of FIGS. 11 and 12 there must be what we prefer to term a "predetermined signal" for starting valve actuation. In the No. 1 launcher the predetermined signal is initiated by the time controller, and in the other launchers in the system by the valve 155 when actuated by a spherical mass of predetermined size. Also, in each of the systems there is a time delay in valve action between its sphere launching position and its return to the sphere loading position.

*Method*

In its broader concept our method, utilizing the novel apparatus described in the foregoing sections, is directed to gas transmission systems. It includes utilization of prevailing line gas pressure and the movement of undersized spherical masses in the liquid removal action. The prevailing pressure of gas flow through the system is used to formulate the motivating force for the propulsion of the spherical masses and liquid which is swept through the lines to an outlet and removed therefrom.

Furthermore, high and low spots in the pipeline, which tend to function as liquid traps intermediate its ends, do not cause a pressure drop over the normal line operating pressure when our method is used. This is considered a major feature of our invention since there has not previously been a method for removing condensed fluid from these traps which has not required auxiliary pressurizing equipment, or liquid storage vessels at each of these traps together with instrumentation which permits either manual or automatic removal of the collected liquid to atmosphere, to storage, or to a separate liquid pipeline. Thus, we are furnishing a method by which a gas transmission pipeline can relieve itself of substantial amounts of liquids which collect in the above mentioned traps without loss of prevailing line pressure.

The novel concept of using spherical masses which are undersized with respect to the internal diameter of the pipeline with which they are used has provided the unobvious and highly beneficial phenomena of almost complete liquid removal with minimum pressure losses to propel and minimum wear and tear on the spherical mass accomplishing the fluid removal operation.

The relationship between the internal diameter of the pipeline and the outer peripheral surface dimensions of the spherical mass require that the maximum peripheral dimensions of the masses be only slightly less than the internal pipeline diameter for optimum operating efficiency. However, the difference between them is a matter of degree dictated and controlled by operating economics.

In the practice of our method, at least one spherical mass is deposited in the pipeline section of substantially uniform internal diameter and has motion imparted to it by the pressure of the prevailing gas flow inherent in the material being transmitted by the pipeline. A spherical mass thus launched sweeps liquid from the pipeline and propels it therethrough, including over points of maximum elevation and minimum depression, to discharge at the end of that section without the necessity of increase, nor the effect of decrease, in the normal transmission system operating pressure.

The foregoing concept is further utilized in our practice for the removal of liquid from a gas transmission pipeline comprising a series of sections of progressively increasing diameter. In such an operation, the terminal end of one section is interconnected with the upstream end of the next pipeline section through a launcher similar in function and operation to the launcher which inserted the first sphere in the first section of the pipeline. Novel instrumentation included with these launchers is adapted to actuate the successive series of launchers according to predetermined signals so as to move the collected spheres with the smallest forward and the largest last.

The terminal portion of the last section of the transmission system is interconnected with receiver means adapted for removal of the spherical masses from the pipeline, separation of them from the gaseous flow by which they have been propelled through the pipeline, and from the liquid associated therewith. In addition, these receiver stations are adapted for the further separation of the liquid from the gaseous constitutents so separated from the spherical masses.

All of the foregoing separation practices of the receiving units of our method utilize the force of gravity for the respective separations above discussed.

In a typical installation using our invention, such as the installation shown in FIG. 1, at a predetermined time, a time controller actuates the No. 1 launcher to insert a first sphere into the pipeline to be treated. The prevailing pressure of the gas flow being transmitted induces and controls movement of the sphere so launched. Upon initial contact with liquid, a gas-liquid seal is formed between the outer peripheral surface of the sphere and the internal surface of the pipeline there adjacent. As the spere is propelled by line pressure and after the gas liquid seal is formed, it sweeps liquid ahead through the pipeline.

As the sphere and liquid progress toward an increased diameter of pipeline, the sphere contacts a sensing unit in the line thereby actuating a No. 2 launcher. A short interval of time after the actuation and after the first launched sphere passes by the No. 2 launcher, an increased diameter sphere is inserted in the pipeline to maintain the above mentioned gas-liquid seal. The foregoing procedure is repeated at succeeding pipeline sections of increased diameter. Thus, when the first and second launched spheres reach the No. 3 launcher (as shown in FIG. 1) the sphere launched by the No. 2 launcher, which is the second of the two already in the line, will actuate the No. 3 launcher, which in turn will insert a third sphere of increased dimension behind the first two spheres.

As the three so launched spheres pass through the pipeline to progressively increasing pipeline sections, commensurate launchings of increased diameter spheres occur. However, at any given point in the pipeline the largest of the spheres therein is always the last, since it is the last launched sphere that forms and maintains the above mentioned gas liquid seal, and the spheres of lesser diameter, at that point have served their useful function and are merely being moved to a point of discharge.

At the end of the pipeline the spheres, and the liquid and gaseous constituents of the material being transmitted, enter a receiver station, such as 5 in FIG. 1.

At the receiver station the spheres are separated from the material transmitted, which material is in turn treated by a gravity separation of gaseous and liquid constituents.

By using launchers and receivers of suitable dimension, it is possible to perform a series of liquid removal operations without operator attention to the system. This is particularly valuable with respect to sphere removal from the receiver station for return to the launcher stations and advantageous in bad weather when the stations are inaccessible.

It will be apparent from the foregoing description that changes and modifications of component parts are within contemplation of the present invention. The arrangements and practices set forth in the preceding description are intended to teach practitioners a convenient and economical way to practice our invention. It will be apparent that the described practices fulfill the objects of our invention and afford an efficient and economical operation requiring a minimum of manual actuation and operator attention without danger of faulty operation.

Having thus described our invention, and the preferred method of practicing the steps thereof, what we desire to have protected by the Letters Patent is set forth in the following claims.

We claim:

1. In a gas transmission system, including a line composed of a plurality of interconnected sections of different diameter and at least one source of supply to the section of least diameter, said sections being of progressively increasing diameter from the upstream to downstream end of the line, a sphere launcher adjacent the intake end of each section of the line having conductive communication through a passage with the line, each said launcher comprising a sphere-retaining chamber for spheres of less but approximately the same diameter as the interior of the line section into which they are directed, said chamber inclining downwardly from its inlet end to its discharge end which opens into said passage into the line and a valve at the discharge end of each said launcher normally positioned for retention of spheres in said chamber and arranged for actuation by control mechanism to discharge a single sphere in each actuation, a receiving unit in conductive communication with the discharge end of the section of line of greatest diameter, said receiving unit including means for separating incoming spheres from the line fluid, means for separating liquid from gaseous constitutents of said fluid, and means for conducting said separated constituents to separate disposal areas, and said receiving means declining from the end in conductive communication with the line to a sphere removal outlet at its opposite end.

2. In a gas transmission system, including a line composed of a plurality of interconnected sections of different diameter and at least one source of supply to the section of least diameter, said sections being of progressively increasing diameter from the upstream to downstream end of the line, a sphere launcher adjacent the intake end of each section of the line having conductive communication through a passage with the line, each said launcher comprising a sphere retaining chamber for spheres of lesser but approximately the same diameter as the interior of the line sections into which they are directed, said chamber inclining downwardly from its inlet end to its discharge end which opens into said passage into the line and a valve at the discharge end of each said launcher normally positioned for retention of spheres in said chamber and arranged for actuation by control mechanism to discharge a single sphere in each actuation, means for actuating said control mechanism located in said line which is responsive to a predetermined size sphere passing through the line, a receiving unit in conductive communication with the discharge end of the section of line of greatest diameter, said receiving unit including means for separating incoming spheres from the line fluid, means for separating liquid from gaseous constituents of said fluid, and means for conducting said separated constitutents to separate disposal areas, said receiving means declining from the end in conductive communication with the line to a sphere removal outlet at its opposite end for gravity removal of spheres.

3. In a gas transmission system, including a line composed of a plurality of interconnected sections of increasing diameter and at least one source of supply to the section of least diameter, a sphere launcher adjacent the intake end of each section of the line having conductive communication through a passage with the line, each said launcher comprising a sphere retaining chamber for spheres of a diameter substantially equal to the interior of the line sections into which they are directed, said chamber inclining downwardly from its inlet end to its discharge end which opens into said passage into the line at an angle of about 7½° to 10° relative to the horizontal, and a valve at the discharge end of each said launcher normally positioned for retention of spheres in said chamber and arranged for actuation by control mechanism to discharge a single sphere in each actuation, means in said line before said launcher communication passage adapted to actuate said control mechanism in response to a predetermined size sphere passing thereby in the line, a receiving unit in conductive communication with the discharge end of the section of line of greatest diameter, said receiving unit including means for separating incoming spheres from the line fluid, means for separating liquid from gaseous constituents of said fluid, and means for conducting said separated constituents to separate storage disposal areas, said receiving means downwardly sloping from the end in conductive communication with the line to a sphere removal outlet at its opposite end at an angle about 5° relative to the horizontal.

4. In pipeline transmission of gas from a source of supply to a point of disposal and including collected liquid in the line, the improvement comprising a plurality of interconnected pipeline sections of increasing diameter forward of the point of disposal, launcher means interconnected adjacent the beginning of and in conductive communication with each of said sections, receiver means adjacent to the end of the section of greatest diameter, valve means in said launchers, actuating means in said sections adjacent and upstream from said interconnection between sections adapted to actuate said valve means in each said launcher, said valve means adapted for launching of one sphere of slightly lesser diameter than the downstream section into the downstream section, said actuating means adapted to be actuated by the sphere launched by the previous launcher, and said receiving means downwardly sloping from adjacent its inlet for gravity removal of spheres.

5. A sphere launcher having an elongated sphere storing barrel downwardly inclined from an inlet to an outlet, a valve including a sphere holding portion in said launcher, said valve arranged for removal of a single sphere through said outlet in each operation, closure means for said inlet, a reducing branch T having three arms, one being interconnected with the outlet of said launcher, first actuating means in a first arm of said T adapted to actuate control mechanism for operating said valve, second actuating means in a second arm of said T also interconnected with control mechanism for operating said valve, said first actuating means adapted to cause movement of said sphere holding portion from communication with said barrel to communication with a third arm of said T for sphere launching, said third arm being the arm interconnected with the outlet of the launcher and of substantially the same diameter as the second arm, said second actuating means adapted to actuate said control mechanism for return of said valve to conductive communication with said barrel, and said second arm of the T being of greater diameter than said first arm but at least equal to said third arm, whereby the control mechanism of said second arm is only actuated by passage of the launched sphere.

6. A sphere launcher having an elongated sphere storing barrel downwardly inclined from an inlet to an outlet, a valve including a sphere holding portion in said launcher, said valve arranged for removal of a single sphere through said outlet in each operation, closure means for said inlet, a reducing branch T having three arms, one being interconnected with the outlet of said launcher, first actuating means in a first arm of said T, and second actuating means in a second arm of said T for operating said valve, said first actuating means adapted to rotate said valve about 180° from communication with said barrel to communication with a third arm of said T for sphere launching, said second actuating means adapted to rotate said valve about 180° to return said valve to conductive communication with said barrel after a short interval of time, said third arm being the arm interconnected with the outlet of the launcher, said second arm of said T being of greater diameter than said first arm and substantially the same diameter as said third arm.

7. A system including a pipeline for conducting gas from sources of supply to a point of discharge at the end of the pipeline, said source of supply being natural gas wells and said discharge point being a disposal area, said pipeline comprising a plurality of interconnected sections of increasing diameter, a plurality of sphere launchers in conductive communication with said sections adjacent their respective intake ends and constructed to launch a sphere into a pipeline section of substantially the same diameter as said section, sphere receiver means adjacent and in conductive communication with the outlet of the section of greatest diameter, a T assembly interconnecting each said launcher and adjacent sections of said pipeline, valve means for each said launcher in conductive communication with each said T, means for rotation of said valves upon actuation by a sphere launched from the previous launcher, additional means for return rotation of each said valve after launching a sphere, each of said valves being arranged for discharge of a single sphere in each operation.

8. The system of claim 7 in which the disposal area is inclusive of means for gravity separation of liquid from gaseous constituents of the gas.

9. In a method of removing collected liquid from a pipeline comprised of varying diameter sections and through which gas is being transmitted and which varies in elevation intermediate its ends, the improvement which comprises: inserting a generally spherical mass into the gas flow into the upstream end of a first section of said pipeline, successively inserting generally spherical masses of progressively increased sizes into the gas flow in said pipeline at the upstream end of each succeeding section, after a sphere entering from the adjoining upstream section has passed the point of insertion, said spheres corresponding in diameter to the section in which they are inserted, propelling the mass last inserted through its pipeline section by the prevailing pressure of said gas flow, forming a gas-liquid seal between said last inserted mass and the inner surface of its pipeline section upon liquid contact so as to sweep all previously inserted masses and contacted liquid past points of higher elevation in its section, separating all masses inserted from the liquid and gas at a discharge point.

10. In a gas transmission system, a pipeline having points of higher elevation between a source of supply and a point of discharge and comprised of a plurality of sections of different diameter, said sections being of progressively increasing diameter from the upstream to downstream end of the line, a sphere launcher at the intake end of each section of the line, a receiving unit adjacent the point of discharge, at least one sphere for movement through the first section of the line under prevailing line pressure so as to sweep collected liquid in the line from points of lower elevation over points of higher elevation to the next section, said sphere having a diameter slightly less than but substantially equal to the inside diameter of the first section of pipeline so as to form gas-liquid seal in the annular space between the inner surface of the line and said sphere when the latter is contacting liquid in said sweeping action, a passage for gravity movement of stored spheres from each said launcher into the pipeline, means including a valve in each launcher for directing a stored sphere into said passage, the launcher of each succeeding section adapted to successively insert an increased size sphere corresponding to the diameter of the pipe section with which it is associated, and means in the receiving unit for separating spheres, liquid and gas reaching the discharge end of the pipeline.

11. A method for purging liquid from a pipeline having a plurality of different pipe diameters which comprises inserting into a smaller diameter of said pipeline a first movable plug having substantially the same diameter as the said smaller diameter, applying fluid measure to said first movable plug to force it through said smaller diameter of said pipeline into a larger diameter of said pipeline, inserting into the upstream end of said larger diameter of said pipeline and upstream of said first movable plug a second movable plug having substantially the same diameter as the said larger diameter, and applying fluid pressure to said second movable plug to force it through said larger diameter of said pipeline.

12. A method as defined by claim 11 wherein said second movable plug is inserted into said pipe line in response to movement of said first movable plug.

13. A pipeline system comprising a pipeline having a smaller diameter upstream portion and a larger diameter downstream portion, means for inserting a movable plug of substantially the diameter of said upstream portion into the upstream end of said upstream portion, and means responsive to the movement of said movable plug into said downstream portion for automatically inserting a movable plug of substantially the diameter of the downstream portion at the upstream end of said downstream portion upstream of the first mentioned movable plug.

14. A launcher for movable plugs comprising an elongated plug storing barrel downwardly inclined from an inlet to an outlet, plug retaining means in said launcher having a plug retaining position and a plug launching position, control mechanism operatively connected to said plug retaining means for operation thereof from said plug retaining position to said plug launching position for removal of a single plug through said outlet in each operation, closure means for said inlet, a reducing branch T having three arms, a first arm being interconnected with the outlet of said launcher, first actuating means in a second arm of said T interconnected with said control mechanism for operating said plug retaining means, second actuating means in a third arm of said T also interconnected with said control mechanism for operating said plug retaining means, said first actuating means adapted upon passage of a plug thereby to actuate said control mechanism to cause movement of said plug retaining means to its plug launching position, said second actuating means adapted, upon passage through said third arm of a plug of substantially the same diameter as said third arm, to actuate said control mechanism for return of said plug retaining means to its plug retaining position, and said third arm of the T being of greater diameter than said second arm, and said first arm being at least equal to said third arm, whereby the second actuating means is only actuated by passage of the launched plug.

15. A method for purging liquid from a pipe line having a smaller diameter upstream portion and a larger diameter downstream portion, which comprises inserting into the upstream end of the upstream portion a first movable plug of substantially the same diameter as the upstream portion, applying fluid pressure to said first movable plug to force it through said upstream portion and into said downstream portion, inserting into the upstream end of said downstream portion and upstream of said first movable plug a second movable plug having substantially the same diameter as the downstream portion, and applying fluid pressure to said second movable plug to force it through said downstream portion.

16. A method as defined by claim 15 wherein said second movable plug is inserted into said pipe line in response to movement of said first movable plug.

17. A pipeline system comprising a pipe line having a smaller diameter upstream portion and a larger diameter downstream portion, first launching means in communication with the upstream end of the upstream portion adapted to insert into said upstream portion a movable plug of substantially the same diameter as said upstream portion, second launching means in communication with the upstream end of the downstream portion, detector means upstream of said second launching means adapted to be actuated by the passage of a movable plug, and means on said second launching means operably associated with and actuable by said detector means adapted to cause said second launching means to insert into the upstream end of the downstream portion of said pipe line and upstream of said first mentioned movable plug a movable plug of substantially the same diameter as said downstream portion in response to actuation of said detector.

18. A pipeline system as defined by claim 17 wherein said second launching means is adapted to retain a plurality of movable plugs, and including means in said second launching means adapted to be positioned to move one movable plug at a time to a position wherein it may be inserted into the downstream portion, and second detector means downstream of the point of communication of said second launching means with said downstream portion adapted to be actuated by a movable plug from said second launching means but not by a smaller diameter movable plug, and adapted to actuate said launching means to move another movable plug to a position wherein it may be inserted into the downstream portion.

19. A pipeline system comprising a pipe line having a smaller diameter upstream portion and a larger diameter downstream portion; first plug launching means adapted to insert a movable plug of substantially the diameter of the upstream portion into the upstream end of the upstream portion; second plug launching means having a plug launching position and a plug retaining position adapted to insert a movable plug of substantially the diameter of the downstream portion into the upstream end of the downstream portion upon actuation thereof to the plug launching position; and means operatively associated with said second plug launching means actuable by the passage of a movable plug from the upstream portion to the downstream portion to move the second plug launching means to the plug launching position; whereby a movable plug of substantially the diameter of the downstream portion is launched upstream of the movable plug from the upstream portion.

20. A pipeline system as defined by claim 19, and including means responsive to the insertion of the plug from the second launching means actuable to move the second launching means to said plug retaining position.

21. A pipeline system as defined by claim 19, and including means at the downstream end of the pipe line for removing all the movable plugs from the pipe line.

References Cited in the file of this patent

UNITED STATES PATENTS

| | | |
|---|---|---|
| 2,454,259 | Shadday | Nov. 16, 1948 |
| 2,745,231 | Prince | May 15, 1956 |
| 2,796,878 | Atkinson | June 25, 1957 |
| 2,851,164 | Morino | Sept. 9, 1958 |
| 2,941,537 | Watkins | June 21, 1960 |
| 2,953,157 | Osborne | Sept. 20, 1960 |
| 2,953,158 | Shea | Sept. 20, 1960 |